UNITED STATES PATENT OFFICE.

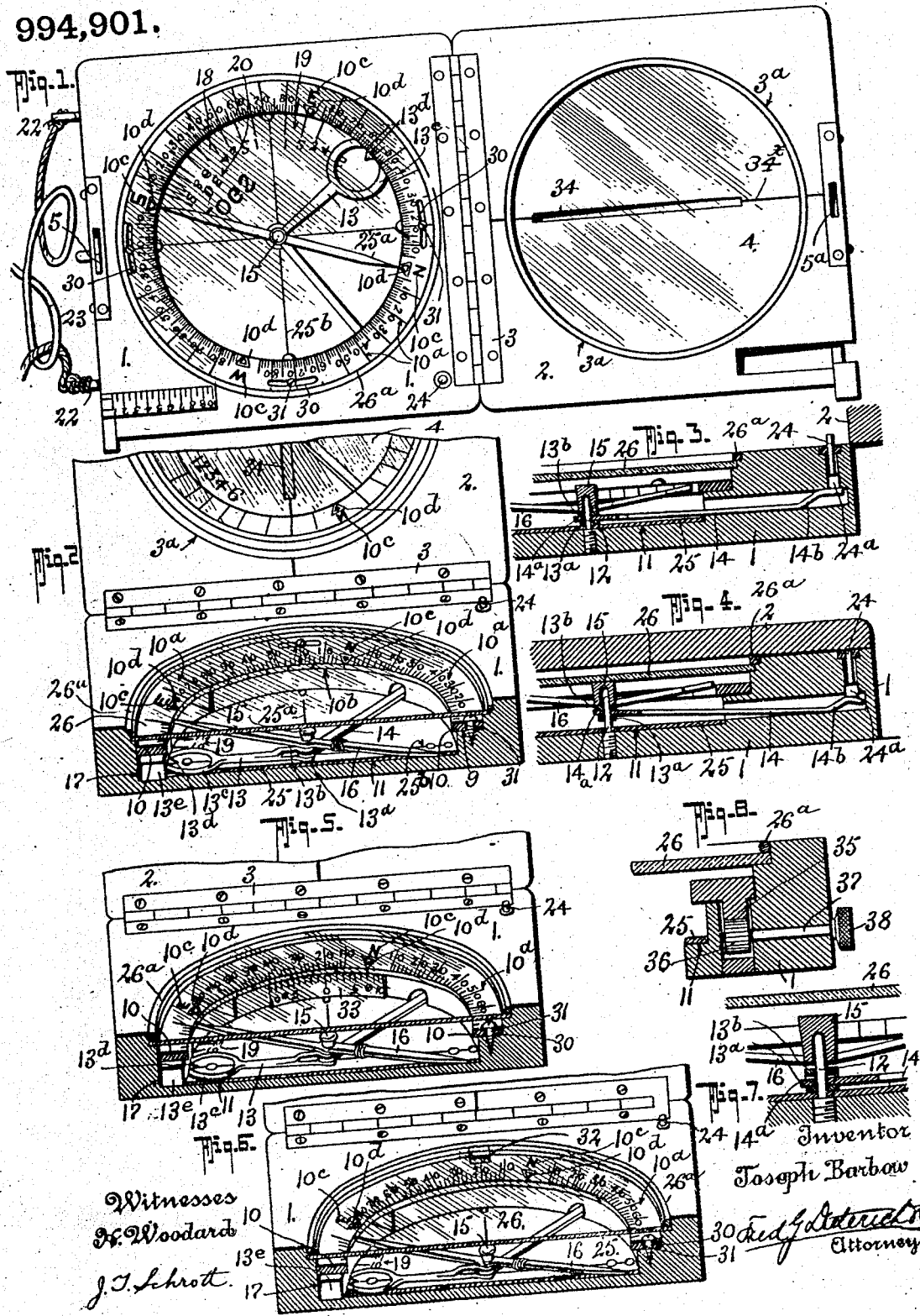

JOSEPH BARBOW, OF PORTLAND, OREGON.

SURVEYING AND CRUISING INSTRUMENT.

994,901.

Specification of Letters Patent. Patented June 13, 1911.

Application filed October 29, 1909. Serial No. 525,311.

*To all whom it may concern:*

Be it known that I, JOSEPH BARBOW, residing in Portland, in the county of Multnomah and State of Oregon, have invented certain new and useful Improvements in Surveying and Cruising Instruments, of which the following is a specification.

My invention relates to certain new and useful improvements in surveying and cruising instruments and it particularly seeks to provide a simple and compact instrument, particularly adapted for loggers' use in surveying land and standing timber and the like in a given section of land, and in its generic nature the invention comprises an instrument having a compass, a weighted indicator member, a reading mirror, and the invention also includes a scale or raised circle divided into quadrants and graduated into degrees from "0" to "90°" in each quadrant, cardinal letters being provided on said circle and a conspicuous indicator being also provided at each of said letters. The letters "E" and "W" are reversed, and means are provided, if desired, for allowing the scale to be moved to make due allowance for the difference between the magnetic and geographic meridians so as to set the scale to accord with the particular locality in which the instrument is to be used. The inner edge of the raised circle is graduated to harmonize with the several corners bounding a section.

My invention also includes a needle lifter to automatically dampen the needle when the instrument is closed, or at the will of the operator, and it also includes means for preventing the needle lifter from sticking or adhering in its upward position when it should be down. The needle lifter serves both as a lock for the compass needle and for the weighted indicator member when the instrument is not in use, to prevent rattling of the parts and consequent injury thereto.

The greater part of the subject-matter of the present application is matter divided out of my copending application, filed June 3, 1909, Sr. No. 499,947.

My present invention also includes those novel details of construction, combination and arrangement of parts, all of which will be first described in detail, then be specifically pointed out in the appended claims, and illustrated in the accompanying drawings, in which:

Figure 1, is a plan view of my complete instrument. Fig. 2, is an enlarged sectional perspective view thereof. Figs. 3—4, are detail sectional views illustrating the operation of the needle lifter. Fig. 5, is a view similar to Fig. 2, of a slight modification of the invention. Fig. 6, is a view similar to Figs. 2 and 5, of a further modification of the invention. Fig. 7, is an enlarged detail sectional view showing the connection between the needle lifter, the weighted member and the needle bearing. Fig. 8, is an enlarged sectional view, illustrating a modified construction.

Referring now to the accompanying drawings, in which like letters and numerals of reference indicate like parts in all of the figures, 1 represents the compass box to which a lid 2 is hinged at 3, the lid 2 being recessed at $3^a$ to receive a mirror 4. The compass box has straight edges for sighting purposes. A latch 5—$5^a$ serves to hold the lid shut when the instrument is not in use. The box 1 has a pocket having a seat 9 on which a ring-like scale plate 10 is secured. The plate 10 is graduated at $10^a$ into degrees running from "0" to "90°" in each quadrant. The cardinal points, "north", "south", "east" and "west" and indicated by the respective letters "N", "S", "E" and "W", as at $10^c$ and are also provided with bold indicating marks $10^d$, as shown clearly in Figs. 1 and 2 of the drawings.

The scale 10 has its variations turned off and set for the particular locality in which the instrument is to be used. The scale 10 is also graduated on its inner edge at $10^b$ to harmonize with the several corners bounding a section of land. A section of land is bounded by the four corner posts between which three quarter posts are set which are known as the one-eighth and one-quarter posts. In graduating the scale $10^b$ the instrument is set at one corner of a section and the north and south line of the section and that of the instrument are made to coincide. A line sighted from the center of the instrument to the one-eighth post on the side farthest from the operator would give the first graduation on the scale $10^b$ to one side of the north and south line. A second line sighted to the one-quarter post would give the second graduation and so on, as will be clearly understood by those skilled in the art to which the invention appertains. The first graduation on the scale 10<sup>b</sup> to one side of the north corner 10<sup>d</sup> indicates an angle of 14° 2'; the second mark indicates an angle of 26° 34'; the third indicates an angle of 36° 52'; the fourth indicates an angle of 45°; the fifth indicates 53° 8'; the sixth indicates an angle of 63° 26'; the seventh indicates an angle of 75° 58' while the eighth indicates an angle of 90°. The pocket 11 of the box 1 has its bottom covered by a scale plate 25 having lines 25<sup>a</sup>—25<sup>b</sup> running at right angles to one another and known as the due north and south and due east and west lines, which, when the instrument is held with the compass needle pointing to the "N" or "north" mark, run respectively due north and south, and east and west. The lines 25<sup>a</sup>—25<sup>b</sup> are the fixed north and south and east and west sighting lines of the instrument and are used as guides in sighting with the instrument. The scale plate 25 is also suitably graduated at 18—19 and 20 to coöperate with the weighted indicator 13, but as such coöperative parts form the specific subject-matter of my original application, a detailed description thereof is thought to be unnecessary in this application.

On a pin 12 projected through the bottom of the box and concentric with the scales 10<sup>a</sup>—10<sup>b</sup>—18—19, is a pendulum 13 having a pair of forked bearing members 13<sup>a</sup>—13<sup>b</sup> to receive the pin 12, such bearing members being formed at one end of the pendulum 13, while a weight 13<sup>e</sup> is provided at the other end thereof to ride in a groove 17 cut into the seat 9 beneath the scale plate 10. The pendulum 13 also has an eye 13<sup>c</sup> and an indicating pointer 13<sup>d</sup>, the pointer 13<sup>d</sup> coöperating with the scales 18—19. Above the bearing ends 13<sup>a</sup>—13<sup>b</sup> a compass needle 16 has a bearing 15 mounted on the pin 12, while a needle lifter 14 has its eye 14<sup>a</sup> pierced by the pin 12 and held between forked bearing eyes 13<sup>a</sup>—13<sup>b</sup> of the pendulum 13. The lifter 14 is a lever fulcrumed at 14<sup>b</sup> and engaged by the head 24<sup>a</sup> of a pin 24 that is held to be engaged by the lid 2 when closed to lift the needle 16 off the pin 12 and hold it against the glass cover plate 26 that is held over the pocket 11 of the box 1 by a spring locking wire 26<sup>a</sup> as clearly shown in Figs. 3 and 4 of the drawings.

The instrument may be carried about by a non-elastic cord 23 secured to eyes 22.

It is to be noted that the "east" and "west" marks 10<sup>c</sup> Fig. 1, of the drawings, are reversed on the scale 10 from the usual position they assume on scales of this type. The numbers and letters on the scale plate 25 are individually reversed to read correctly in the mirror 4.

By providing the pendulum 13 with bearings 13<sup>a</sup>—13<sup>b</sup> to straddle the needle lifter 14 the weight of the pendulum 13 will always serve to force the needle lifter 14 downwardly into the position shown in Fig. 3, when the instrument is in a horizontal position, and when the lid is open and prevent sticking thereof, so that the needle 16 will have free movement on the pin 12.

In order that the scale 10 may be adjusted for use in the particular locality where it is desired to use the instrument so as to make due allowance for the variation between the magnetic and geographic meridians at that place, I may provide the scale 10 with slots 30, through which the screws 31 pass, and by loosening up the screws 31, the scale 10 may be turned the required distance to make it accord with the locality in which the instrument is to be used, the scale being again held from turning by tightening the screws 31. One or more slots 30 and screws 31 may be provided, as desired, three being shown in Fig. 1, or a single screw and slot may be used, as shown in Fig. 6, and a plate 32 may be provided to prevent the scale 10 from rising up.

The changing of the graduated scale to allow for the variations between the magnetic and geographic meridians is commonly known in the art as practiced in lumber regions as "turning off the variations" and when that expression is used in this application I desire it to be given the meaning stated.

If desired a vernier 33 as shown in Fig. 5 may be attached to the box to coöperate with the scale 10 so that a more accurate adjustment of the scale 10 can be made, the vernier being of any approved construction and used in the usual manner.

The general operation of the instrument will be readily understood by those skilled in the art, but I might mention that if desired the box and lid may be swung with their adjacent faces into a coincident plane, as shown in Fig. 1, and sighting take place across the faces of the box and lid, or it may be advisable to provide the lid with a slot 34 across which the mirror glass is left unsilvered and to provide a line 34<sup>x</sup> on the lid which when the lid and the box of the instrument are lying parallel, as shown in Fig. 1, will form, as it were, a continuation of the north and south line 25<sup>a</sup> and will pass through the central longitudinal plane of the slot 34 so that when it is desired the compass box 1 may be held horizontally and the lid 2 tilted upwardly, so that the operator can sight across the upper edge of the lid and by causing the reflections of the line 25<sup>a</sup> in the mirror 4 to coincide with the line 34<sup>x</sup>, the operator can sight directly north and south across the upper edge of the lid when tilted up and at the same time the reading on the scales will be visible to him, or if he so desires, he can sight directly through the slot instead of across the upper edge of the lid.

If desired, the scale 10 may be provided with a rack portion 35 on its under surface to coöperate with a pinion 36 on a shaft 37 that carries a milled thumb nut 38, so that the scale 10 may be turned in its own plane to turn off variations without removing the protecting glass 26, if desired. The friction between the shaft 37 and the box 1 is sufficient to hold the scale plate 10 in its adjusted positions.

My invention is particularly designed for use in connection with a booklet published by me in 1909, known as "*Barbow's Booklet in Tree Scale and Section Diagram*," (copyrighted 1909) wherein numerous tables are given for use in connection with my instrument whereby its use is largely facilitated and wherein may be found the necessary data for correcting any variations in the direct reading of the scales.

From the foregoing description taken in connection with the accompanying drawings, it is thought the complete construction, operation and advantages of my invention will be readily understood by those skilled in the art to which the invention appertains.

Slight changes in the details of construction may be readily made without departing from the invention.

What I claim is:

1. A surveying instrument that comprises a compass box, a compass needle mounted in said box, a scale plate coöperating with said compass needle and having the cardinal points provided with indicating letters "N"—"S"—"E" and "W", said scale plate having pointers graduated on the same at the north, south, east and west letters to accentuate the indication of the north, south, east and west positions, a second scale plate carried by said box beneath said compass needle and having graduated on the same a due north and south and a due east and west line, a lid hinged to said box, a mirror carried by said lid to reflect said compass needle and said scales when said lid is tilted up at an angle to the plane of said box, said lid having a line thereon according to the north and south line of said second scale plate.

2. A surveying instrument that includes a compass box, a compass needle mounted in said box, a scale plate coöperating with said compass needle and graduated into degrees and minutes, a second scale plate carried by said box beneath said compass needle and having graduated on the same a due north and south, and east and west line, a lid hinged to said box, a mirror carried by said lid to reflect said compass needle and said scales when said lid is tilted up at an angle to the plane of said box, said lid having a line thereon corresponding to the north and south line of said second scale plate.

3. A surveying instrument that includes a compass box, a compass needle mounted in said box, a scale plate coöperating with said compass needle and graduated into degrees and minutes, a second scale plate carried by said box beneath said compass needle and having graduated on the same a due north and south line, a lid hinged to said box, a mirror carried by said lid to reflect said compass needle and said scales when said lid is tilted up at an angle to the plane of said box, said lid having a line graduated thereon corresponding to the north and south line of said second scale plate, said lid having a slot corresponding to said line.

4. A surveying instrument comprising a compass box having a straight edge, a compass needle mounted in said box, a scale coöperating with said compass needle, the box having a lid hinged thereto, a mirror carried by said lid for reflecting said scale and compass needle, said lid having a sighting slot and said mirror having a transparent portion alining with said sighting slot, said lid also having a line thereon alining with said slot, and said compass box having a due north and south line to coöperate with the line and slot on the lid.

5. A surveying instrument consisting of a compass box, a compass needle mounted within said box and scale plates coöperating with said compass needle, a compass needle lifter mounted within said box, said box having a lid, means movable by the lid of said box for operating said needle lifter to engage said needle when the box is closed, and a weighted member coöperating with the compass needle engaging portion of said needle lifter, to release said needle lifter from engagement with said compass needle when the box lid is open.

6. In an instrument of the character stated, a box having a lid, a degree scale plate mounted in said box and having cardinal points provided with indicating letters "N"—"E"—"S" and "W" respectively and having supplemental indicator marks coöperating with such letters, a compass needle mounted in said box to coöperate with said scale plate, a supplemental scale plate mounted beneath said compass needle having fixed "east" and "west" and "north" and "south" lines, said lid having a sighting slot to aline with said "north" and "south" lines, a mirror carried by said lid to reflect said scale plates and compass, and means adjustably holding said scale to permit turning of said degree scale plate to adjust the same to allow for the differences between the magnetic and geographic meridians at the place where the instrument is used.

7. In an instrument of the character stated, a compass needle and a degree scale plate coöperating therewith, said plate being graduated from "0" to "90°" in each quadrant, and said plate also having graduations for indicating the bounding corners of a section of land.

8. In an instrument of the character stated, a compass needle and a degree scale plate coöperating therewith, said degree scale plate being graduated from "0" to "90°" in each quadrant to form a degree scale, and said scale plate also having a second series of marks forming a supplemental scale coöperating with said compass needle and indicating the bounding corners of a section of land.

9. In an instrument of the character stated, a compass needle and a degree scale plate coöperating therewith, said plate being graduated from "0" to "90°" in each quadrant, said plate having graduations for indicating the bounding corners of a section of land, and a hinged mirror coöperating with the aforesaid parts.

10. In an instrument of the character stated, a compass needle and a degree scale plate coöperating therewith, said degree scale plate being graduated from "0" to "90°" in each quadrant to form a degree scale, said scale plate having a second series of marks forming a supplemental scale coöperating with said compass needle and indicating the bounding corners of a section of land, and a hinged mirror coöperating with the aforesaid parts.

11. In an instrument of the character stated, a compass needle and a degree scale plate coöperating therewith, said plate being graduated from "0" to "90°" in each quadrant, said plate having graduations for indicating the bounding corners of a section of land, and a hinged mirror coöperating with the aforesaid parts, said mirror having a transparent sighting slot-like portion.

12. In an instrument of the character stated, a degree scale plate having the cardinal points provided with the indicating letters "N"—"E"—"S" and "W", being reversed to the usual order, a compass needle mounted to coöperate with said scale plate, a box in which said scale plate and needle are mounted, and a movable mirror carried by said box to reflect said scale plate.

13. In an instrument of the character stated, a box having a chamber, a degree scale plate mounted in said chamber, a compass needle mounted in said chamber to coöperate with said scale plate, a lid hinged to said box, a mirror carried by said lid, said box having a "north and south" graduated line and said lid having a corresponding line traversing said mirror.

14. In an instrument of the character stated, a box having a chamber, a pin projecting into said chamber, a compass needle mounted on said pin, a needle lifter for raising said compass needle off of said pin, said box having a lid, means controlled by said lid for operating said needle lifter to lift said needle when said lid is closed, and means mounted on said pin for engaging said needle lifter to restore it to its initial position to disengage the compass needle when said lid is open.

15. In an instrument of the character stated, a box having a chamber, a degree scale plate mounted in said chamber, said scale plate being of ring-like form, a compass needle mounted in said chamber and of a length less than the lesser diameter of said scale plate, a vernier scale plate mounted in said chamber at substantially right angles to said degree scale plate to coöperate therewith, a third scale plate mounted in said chamber in a plane beneath said needle, said third scale plate having thereon lines designating due north and south, a lid hinged to said box, said lid having a mirror and having a line on the same corresponding to said north and south lines.

JOSEPH BARBOW.

Witnesses:
J. T. McCann,
J. L. Wigle.